Feb. 3, 1948.  C. R. ROGERS ET AL  2,435,513
LUBRICANT COOLING RADIATOR FOR REAR ENGINE VEHICLES
Filed July 19, 1943  3 Sheets-Sheet 1

Inventors:
Clifford R. Rogers,
William O. Bechman
and David B. Baker.
By Paul O. Pippel
Attorney.

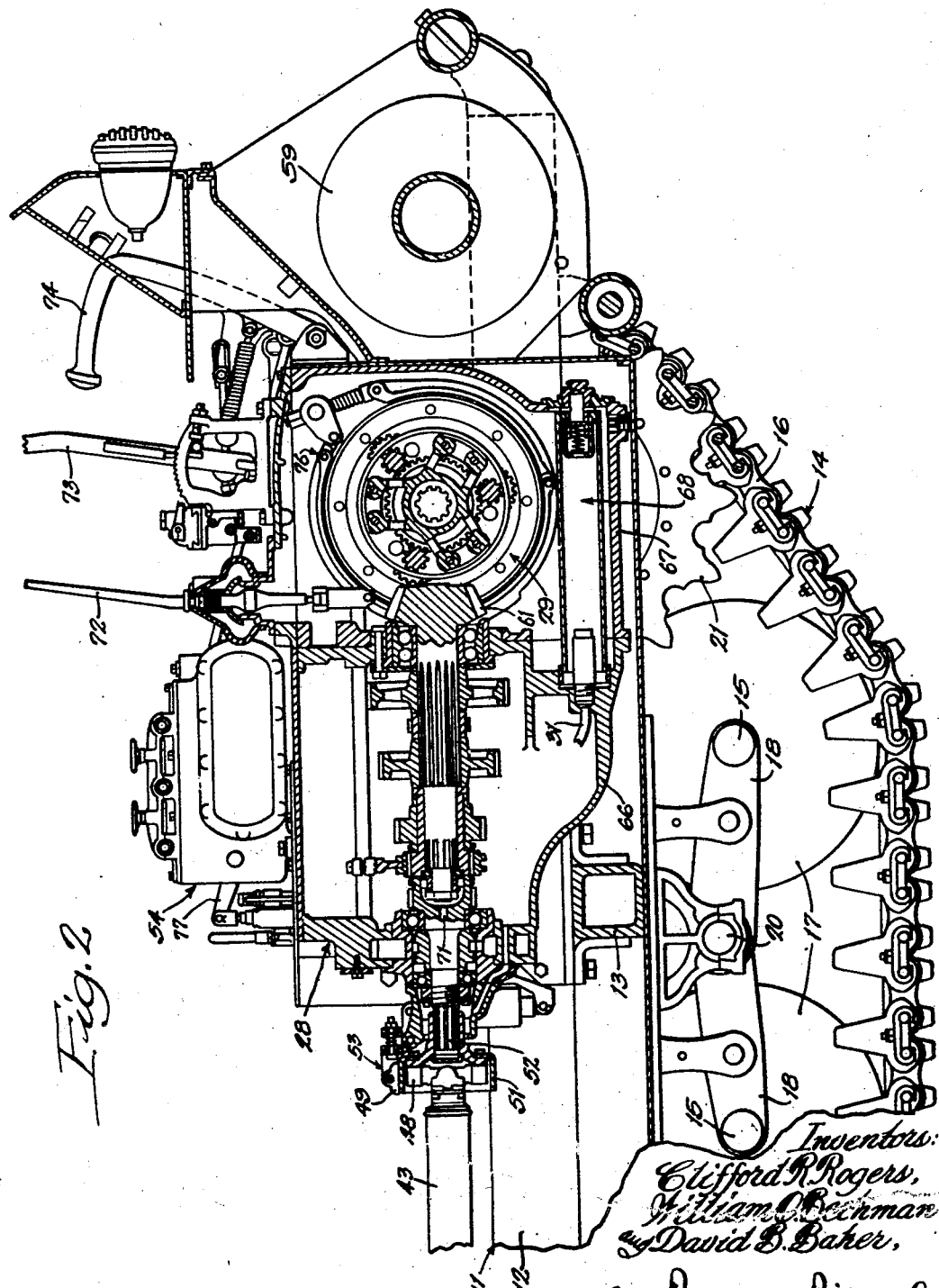

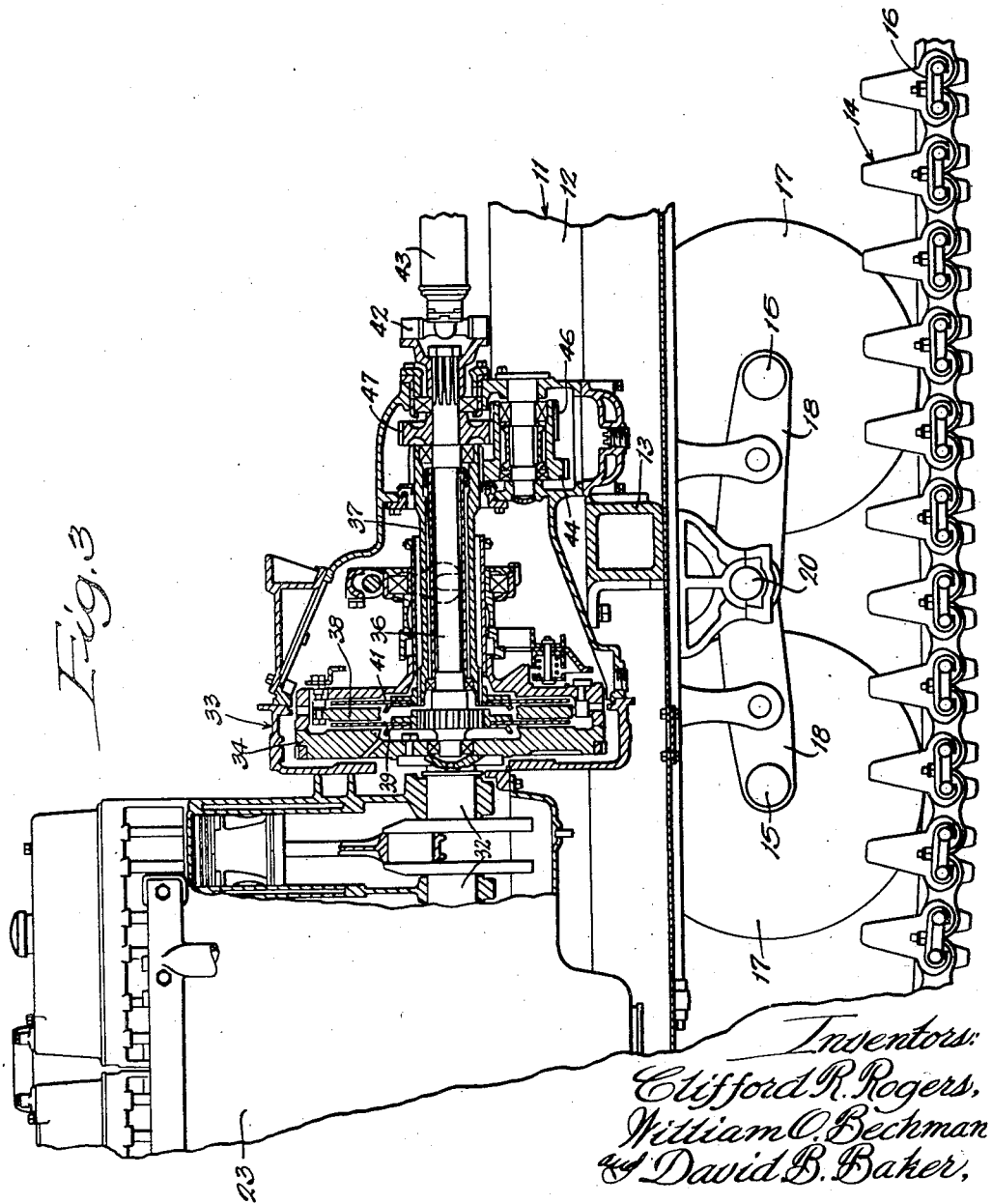

Patented Feb. 3, 1948

2,435,513

UNITED STATES PATENT OFFICE 2,435,513

LUBRICANT COOLING RADIATOR FOR REAR ENGINE VEHICLES

Clifford R. Rogers, Oak Park, William O. Bechman, Chicago, and David B. Baker, Riverside, Ill., assignors to International Harvester Company, a corporation of New Jersey Application July 19, 1943, Serial No. 495,264

1 Claim. (Cl. 180—54)

1

This invention relates to a new and improved lubricant cooling radiator for vehicles having engines at the rear thereof.

Heretofore, tractors, and particularly those tractors of the track type, have employed the prime mover or engine at the forward end of the tractor chassis. In contradistinction to this arrangement, the present invention employs an engine at the rear of the tractor chassis. Others have also placed the engine at the rear of a vehicle, but, whereas previously the positioning of the engine at the rear end of the chassis was for the purpose of having the source of power closely adjacent the rear driving wheels or tracks, the present invention employs an extended relationship of power drive units essential in operating any vehicle and positioned in substantially inverse order to that of an ordinary vehicle and wherein the differential is at the extreme forward end of the chassis.

An important object of this invention is to provide a rear engine vehicle with coolant radiators positioned at either side thereof and an engine lubricant radiator in longitudinal alignment with one of said coolant radiators.

Another important object of this invention is the provision of single means for drawing air in through side mounted coolant and lubricant radiators positioned adjacent the rear of a vehicle.

Other and further important objects of this invention will become apparent from the disclosures in the following specification and accompanying drawings, in which:

Figure 2 is a sectional view of the tractor taken on the line 2—2 of Figure 1; and Figure 3 is a continuation of the sectional view of Figure 2 taken on the line 3—3 of Figure 1.

Figure 1:
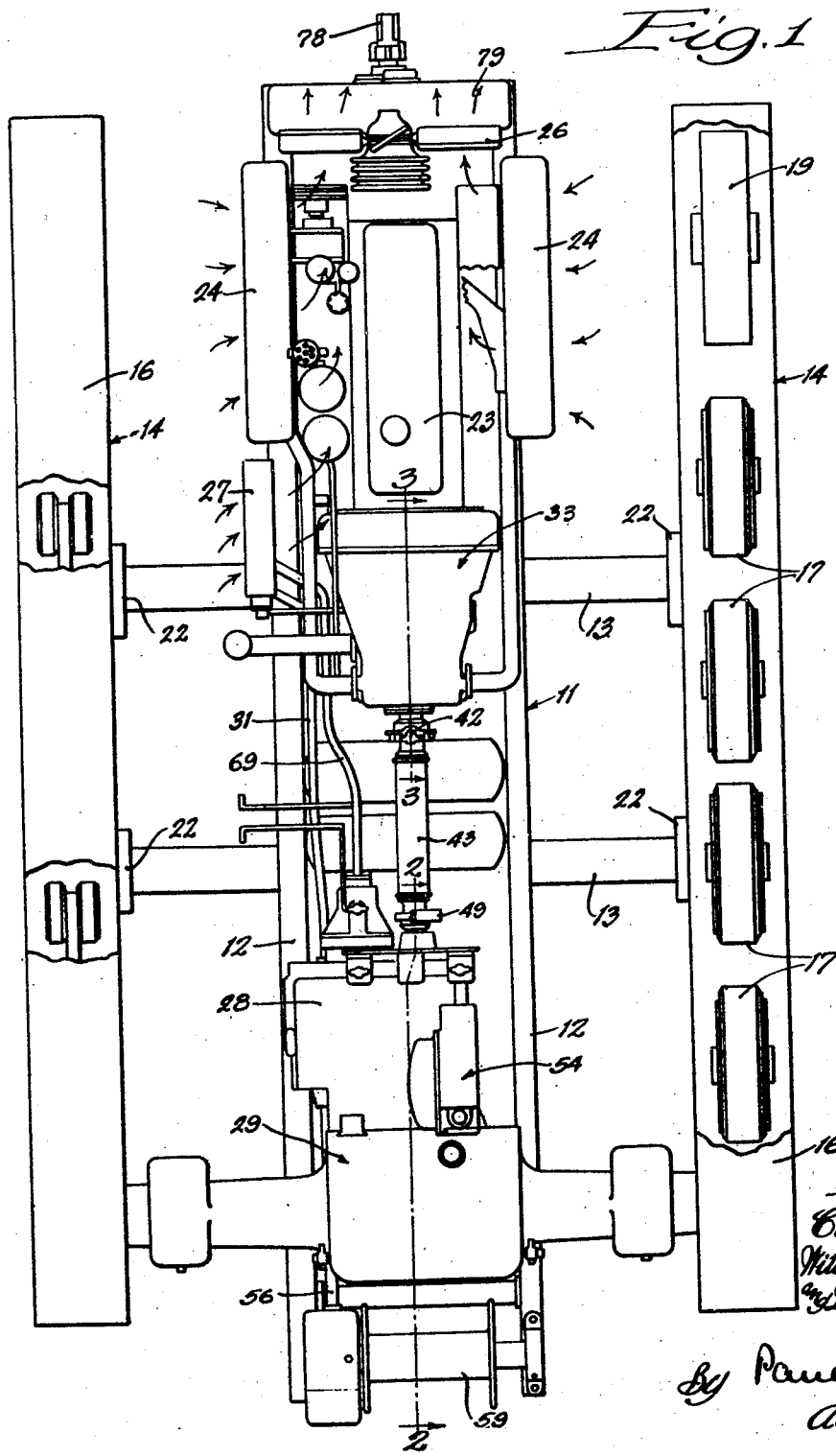
Figure 1 is a top plan view of the tractor chassis, showing the several drive units mounted thereon.

As shown in the drawings, the reference numeral 11 indicates generally a chassis of a tractor vehicle comprising a pair of longitudinally extending beams 12 and a pair of transverse hollow beams 13 fixedly attached to the longitudinal beams, so that the entire chassis 11 is as a single unit. Track assemblies 14, consisting of an outer flexible track 16, two pairs of bogie wheels 17, their supporting brackets 18, as best shown in Figures 2 and 3, an idler wheel 19, and a front drive sprocket 21, are mounted on the outer ends of the transverse chassis beams 13 at 22. The brackets 18 connect the axles 15 of bogie wheels 17. The brackets 18 are in turn pivoted centrally

2 about a shaft 20 to enable the bogie wheels 17 to have the necessary flexibility when striking an obstacle. The drive sprockets 21 are positioned at the forward end of the vehicle, as can be seen in Figure 2 of the drawings. An engine or prime mover 23 employed on the vehicle is positioned on the rear end of the longitudinal beams 12 of the tractor chassis 11, as shown in Figures 1 and 3. The engine 23 is equipped with a pair of radiators 24 mounted alongside the engine and positioned parallel with the longitudinal chassis beams 12. An engine fan 26 is positioned at the rear of the engine and when in operation draws air in through the side-mounted radiators 24. A supplemental radiator 27 is positioned forwardly of one of the hot water radiators 24 and is adapted to cool the lubricant employed in a transmission 28 and a differential 29 by means of a supply tube 31 extending therebetween.

The engine 23 drives a crank-shaft 32 which transmits its rotation to a clutch 33 positioned closely adjacent the engine and forwardly thereof. The clutch 33 is of the dual speed type wherein the rotation of a fly-wheel 34 may be transmitted directly through a central shaft 36 or through a superposing sleeve shaft 37 by engagement respectively of a shiftable clutch plate 38 with either a clutch plate 39 in a leftward direction or with a clutch plate 41 in a rightward direction. When the clutch plates 38 and 39 are engaged, the central shaft 36 is driven and drives directly through a universal joint 42 to a propeller shaft 43, whereas, when the clutch plates 38 and 41 are engaged, the sleeve 37 is driven and drives the shaft 36 indirectly through gears 44, 46, and 47 and thus drives the propeller shaft 43 at a reduced rate of speed.

The propeller shaft 43, as shown in Figure 2, extends forwardly to a universal driving joint 48 around which is positioned a brake shoe 49 adapted to engage a drum 51 which is formed as a unit with a driven shaft 52. A brake 53 consisting of the brake shoe 49 and the brake drum 51 is automatically actuated by means of a clutch selector 54 when the drive in the clutch is shifted from the central shaft 36 to the outer sleeve shaft 37, or vice versa. In other words, shifting of the clutch speeds takes place when the driving and driven elements are stopped or substantially stopped.

The final drive or differential 29 is positioned closely adjacent the transmission 28 and immediately forward thereof, so that a bevel pinion gear 61 driven from the transmission 28 and imparting rotation to a beveled gear 62 drives the sprockets 21 through gears 63 and 64. Housings 66 and 67 of the transmission and differential, respectively, are interconnected, so that a lubricant in one housing flows freely to the other. In furtherance of this lubricating, a filter 68, provided within the final drive housing 67, is adapted to clean the lubricant and cause it to be cooled by forcing it through the tube 31 to the lubricant cooling radiator 27, whereupon it is returned through a tube 69 and lubricates the bearings in the transmission through a central channel 71 in the shaft 52, as shown in Figure 2.

The tractor vehicle is supplied with several operating levers and pedals, such as a gear shift lever 72, which is adapted to shift the gears in the transmission 28, steering or brake levers 73, and a clutch pedal 74. The steering levers 73 are two in number and, as in the majority of track-type tractors, a shifting of either one of them with respect to the other causes a change in the driving ratio between the driving sprockets 21 by reason of brakes 76 positioned in the differential 29.

The clutch pedal 74 is directly connected to the clutch selector 54 and acts to shift the lever arm 77 either upwardly or downwardly, thereby causing a shifting of the dual clutch plate 38.

The purpose of the winch 59 is to assist in pulling the vehicle when it is stuck. In traveling over rough terrain, ditches, or the like, a cable is generally attached to some tree or other solid object, and the cable is then wound up on the winch, thus drawing the vehicle toward the tree or other stationary object.

It will be apparent from the particular construction of the chassis and the positioning of the power drive units thereon that the driving forces will be transmitted through a minimum number of parts to a drawing hitch 78 at the rear of the vehicle. This particular tractor is designed especially to draw heavy guns or cargo trailers, and it is, therefore, essential that the vehicle be built as sturdy as possible, enabling the traction tracks 14 to transmit their driving force through the transverse beam 13 of the chassis, thence back through the longitudinal beams 12 of the chassis to a cross member 79 and there to the hitch.

It is believed that the positioning of the drive units in an inverse order to that of the ordinary vehicle is novel, and it is especially believed that this is true when it is noted that the extended propeller shaft 43 is positioned between the clutch and transmission rather than between the transmission and differential.

The intention is to limit the invention only within the scope of the appended claim.

What is claimed is:

In a tractor having a chassis, a plurality of drive units positioned along the length thereof, an engine mounted near the rear of said chassis, a fan at the rear of said engine, a pair of hot water engine radiators paralleling the sides of said engine, a transmission and differential positioned on the fore end of the chassis, a lubricant for said transmission and differential, and a radiator for effecting cooling of said lubricant, said last-named radiator in longitudinal alinement with and positioned forwardly of one of said engine radiators, whereby the fan positioned at the rear of the engine is adapted to draw air in through all three radiators thereby causing cooling of lubricant in the lubricant radiator and water in the water engine radiators.

CLIFFORD R. ROGERS.
WILLIAM O. BECHMAN.
DAVID B. BAKER.

REFERENCES CITED

The following references are of record in the file of this patent:

UNITED STATES PATENTS

| Number | Name | Date |
|---|---|---|
| 613,297 | Palmtag | Nov. 1, 1898 |
| 1,282,328 | Turnbull | Oct. 22, 1918 |
| 1,329,769 | Johnson | Feb. 3, 1920 |
| 1,419,243 | Foote | June 13, 1922 |
| 1,443,768 | Stahl | Jan. 30, 1923 |
| 1,461,028 | Davis | July 10, 1923 |
| 1,719,857 | Stockfleth et al. | July 9, 1929 |
| 1,747,868 | Guernsey | Feb. 18, 1930 |
| 1,888,644 | Turzicky | Nov. 22, 1932 |
| 1,936,318 | Windberger | Nov. 21, 1933 |
| 2,035,858 | Bauer et al. | Mar. 31, 1936 |
| 2,204,926 | Clingerman | June 18, 1940 |
| 2,223,262 | Merkle | Nov. 26, 1940 |
| 2,242,494 | Wolf | May 20, 1941 |
| 2,250,282 | Klavik | July 22, 1941 |
| 2,253,438 | Lutz | Aug. 19, 1941 |